April 21, 1970  G. P. BARBARO  3,507,400
SAFETY LOCKING CONSTRUCTION FOR ADJUSTABLE STORAGE RACKS
Filed July 8, 1968  2 Sheets-Sheet 1
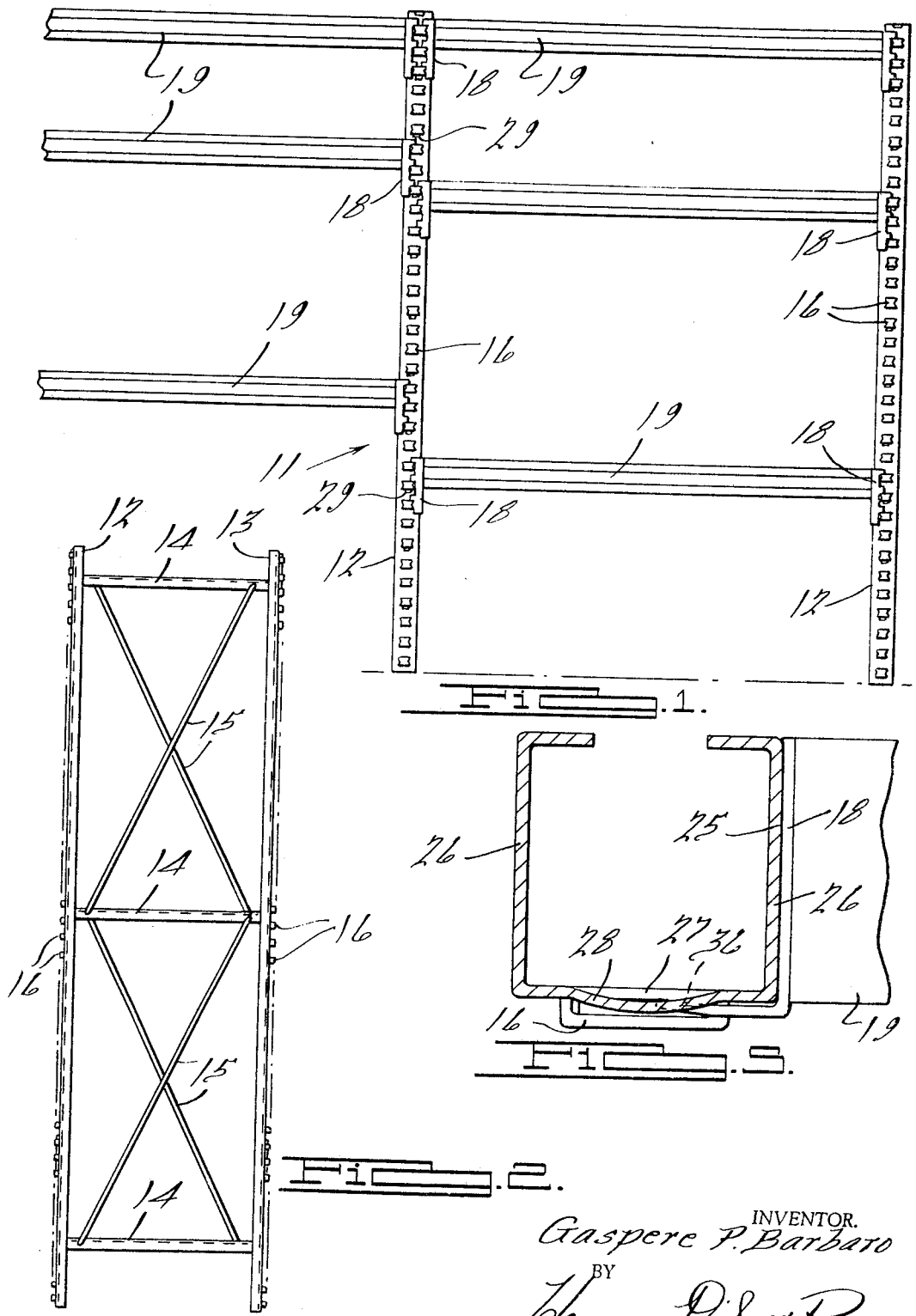
INVENTOR.
Gaspere P. Barbaro
BY
Harness, Dickey & Pierce.
ATTORNEYS.

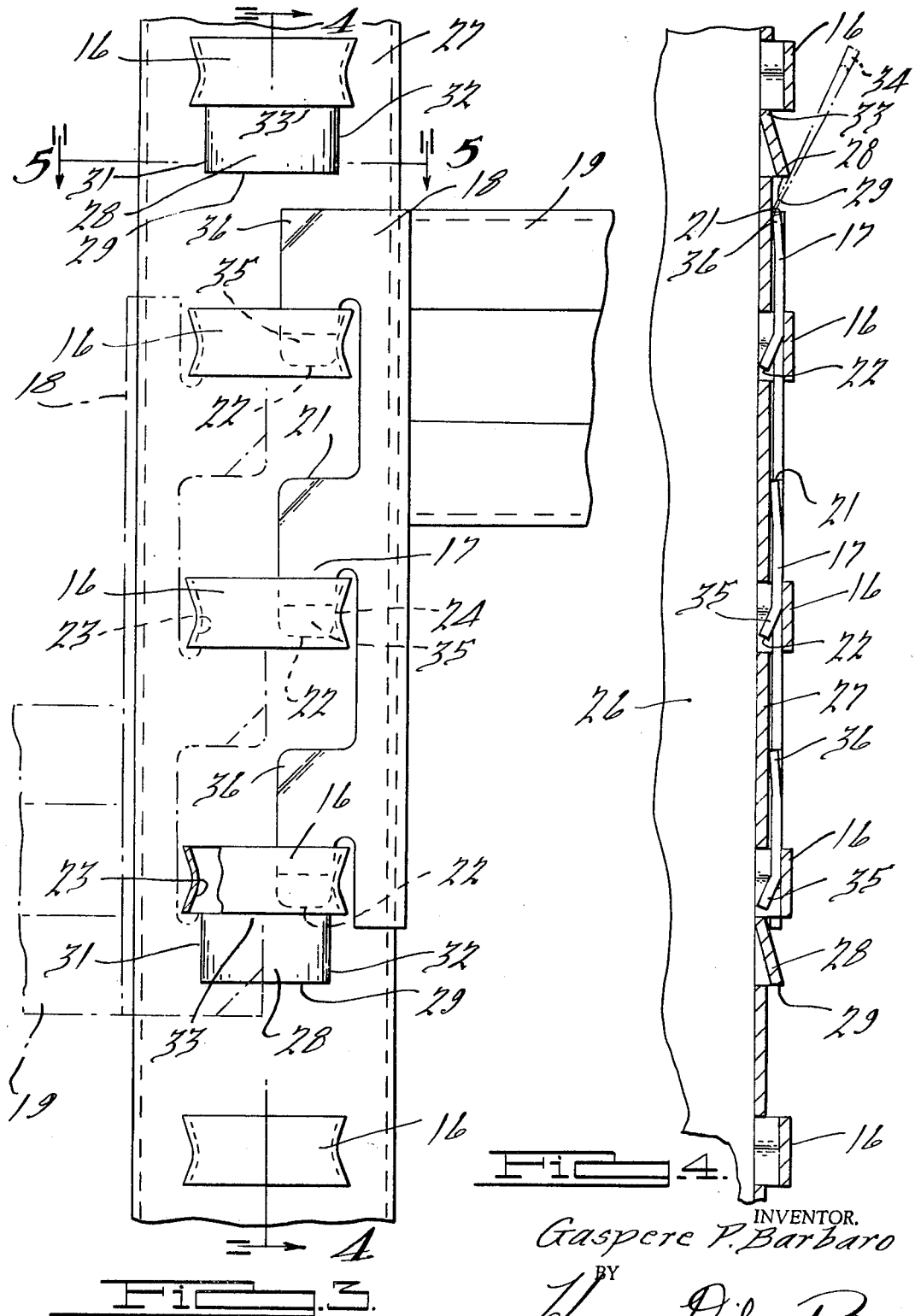

United States Patent Office 3,507,400
Patented Apr. 21, 1970

3,507,400
SAFETY LOCKING CONSTRUCTION FOR
ADJUSTABLE STORAGE RACKS
Gaspere P. Barbaro, Detroit, Mich., assignor to
Palmer-Shile Company, Detroit, Mich., a corporation of Michigan
Filed July 8, 1968, Ser. No. 743,233
Int. Cl. A47f 5/10
U.S. Cl. 211—176
2 Claims

ABSTRACT OF THE DISCLOSURE

An adjustable storage rack having slotted columns and beams with teeth at their ends fitting into the column slots with a wedging action. A locking device is provided for preventing inadvertent removal of the teeth, comprising angularly pressed-out tabs at spaced intervals along the column. The teeth will snap into position under the tabs and may be removed by prying them out temporarily with a screwdriver and then lifting them.

BACKGROUND OF THE INVENTION

Field of the invention

The invention relates to adjustable storage racks of the type shown in Patent No. 3,044,633, issued July 17, 1962, to Edward A. Baker, Jr., and entitled "Adjustable Storage Rack." Such storage racks have columns with pressed-out slots, and the beam ends have connecting members with downwardly extending teeth received by the slots which wedge them toward the column. The teeth, however, can be sometimes inadvertently loosened in the slots, for example, by being struck by a fork lift truck. Since these storage racks are generally used in industrial applications, it becomes important to provide safety locking means for preventing this inadvertent loosening.

Description of the prior art

It is known to have separate safety locking members for this type of rack such as the type shown in Patent No. 3,240,352, issued Mar. 15, 1966, to Edward A. Baker, Jr., and entitled "Safety Lock for Adjustable Storage Racks." However, these members have several disadvantages, such as the fact that they are separable from the column itself and can be jarred loose or otherwise rendered ineffective with the passage of time.

BRIEF DESCRIPTION OF THE INVENTION

According to the invention, a safety locking means is provided which is integrally connected to the column itself and therefore cannot be loosened or otherwise rendered ineffective except by a deliberate retraction of the lock. The locking means consists of a plurality of tabs which are partially severed from the main portion of the column web and are pressed out in an inclined manner in the same direction as the pressed-out slots. The teeth on the connecting members on the beams will be forced past these pressed-out tabs when they are entering the retaining slots, and will snap into position under the tabs so that the teeth on these members cannot be withdrawn from the slots. The tabs are spaced along the column so that all slots on the columns may be utilized and the beam mounted in any of its available positions with the locking means still being effective. The upper portions of the teeth are bent inwardly to insure engagement with the tabs, and the lower portions are bent inwardly to facilitate entry into the slots. In the illustrated embodiment, slots are provided for teeth entering the column slots in both directions, although other means will be used for locking the teeth when entering in one direction.

BRIEF DESCRIPTION OF THE DRAWINGS

FIGURE 1 is a front elevational view of a portion of an adjustable storage rack utilizing the locking means of this invention;

FIGURE 2 is a side elevation view of the storage rack of FIGURE 1;

FIGURE 3 is an enlarged fragmentary front elevational view of one of the columns, showing the locking tabs;

FIGURE 4 is a side elevational view, partly in cross section along the line 4—4 of FIGURE 3, of a column portion showing the manner in which a locking tab coacts with beam end connecting members; and FIGURE 5 is a cross-sectional plan view taken along the line 5—5 of FIGURE 3 and showing the construction of the column.

DESCRIPTION OF THE PREFERRED EMBODIMENT

The adjustable storage rack is generally indicated at 11 and comprises pairs of front and rear columns 12 and 13, seen in FIGURE 2, each pair of columns being connected by horizontal members 14 and diagonal braces 15. The columns have pressed-out slots 16 adapted to receive teeth 17 on L-shaped connecting members 18 which are secured to the opposite ends of beams 19. These beams extend between adjacent columns and may be adjusted in height by choosing the slots 16 into which teeth 17 are inserted. The teeth 17 extend downwardly, and three such teeth are formed on each bracket 18. The upper edge 21 of each tooth is spaced downwardly from the lower edge 22 of the tooth immediately above it, and the tooth spacing is equal to the spacing of slots 16. The slots have side walls 23 which flare outwardly in both directions and coact with the inner edges 24 of teeth 17 to cause a wedging action which draws the surfaces of brackets 18 (FIGURE 5) into engagement with the side walls 26 of columns 12 and 13. Briefly, however, this construction enables teeth 17 to be inserted in the slots in opposite directions so that the columns may be reversed when the lower ends of the columns have been dented and thereby weakened.

The construction of each column 12 and 13 is shown more particularly in FIGURE 5. The column has a central web 27 which connects side walls 26 and from which slots 16 are outwardly pressed. The side of the column opposite web 27 is partially open. The safety locking construction utilizes portions of web 27 and comprises a plurality of tabs 28 which are severed from web 27 along their bottom edge 29 and are pressed out but not severed from the web along their side edges 31 and 32, as seen in FIGURE 3. The upper edge 33 of each tab remains connected to web 27. Each tab is pressed outwardly in an inclined manner as seen in FIGURE 4 so that its lower edge 29 is approximately in the plane of teeth 17 on connecting member 18.

It will be noted that slots 16 are wide enough to receive teeth from connecting members on opposite sides of each column, and the tabs 28 are likewise wide enough to engage such teeth. In the illustrated embodiment, three teeth are formed on each connecting bracket 18, and the tabs 28 are formed between every third pair of adjacent slots 16. In this manner, the teeth 17 may be inserted in any slots and there will still be a locking tab 28 which will face the upper edge 21 of one of the three teeth on the connecting bracket.

In operation, teeth 17 will be inserted in slots 16 and as they are pressed downwardly will be temporarily forced outwardly. When the upper edge 21 of the tooth 17 which engages tab 28 passes edge 29, the tooth will snap inwardly into its unstressed position as shown in FIGURE 4. In this position, tab 28 will prevent withdrawal of teeth 17 from slots 16.

If it is desired to remove connecting member 18 from the column, it is merely necessary to insert a screwdriver shown partially in phantom lines at 34 into the space between upper edge 21 of tooth 17 and the tab 28 immediately about it. Upward hammering on connecting member 18 will then force the upper portion thereof to ride up on the shank of the screwdriver which is supported by tab 28 and the adjacent area of column web 27. This will slightly but not permanently spring member 18 outwardly. After its upper edge 21 has been lifted above the lower edge 29 of the tab, the screwdriver can be removed and the connecting member lifted from the slots.

In the illustrated embodiment, other locking means (not shown) such as that shown in aforementioned Patet No. 3,240,352 can be used if column 12 or 13 is reversed as expalined above. Interference between any tab 28 and a tooth 17 being inserted after the column has been reversed can be avoided by depressing the tab. This can be accomplished by a few blows of a mallet.

In order to insure entry of teeth 17 into slots 16, despite the fact that the teeth are urged away from web 27 by tab 28, the lower ends 35 of the teeth are bent inwardly, as seen best in FIGURES 4 and 5. The upper portions 36 of teeth 17 are also bent inwardly, thus insuring puroper engagement of edges 21 with locking tabs 28.

What is claimed is:

1. In an adjustable storage rack of the type having columns with sides and a connecting web, a series of pressed-out vertically spaced slots in the webs of said columns, and beams having end connecting members with a series of vertically spaced downwardly extending teeth receivable by said slots and having upwardly facing edges, said teeth being capable of outward springing, a locking construction comprising a plurality of tabs beneath certain of said slots, said tabs being severed from said web along their lower edges, pressed out but connected to said web along their side edges, and connected to said web along their upper edge, said tabs being pressed outwardly in an inclined manner so that their lower edges are approximately in the plane of said teeth, whereby one of said tabs will cause one of said teeth to spring outwardly as it is forced past said tab into one of said slots, until said tooth snaps back into its unstressed position as its upper edge passes the lower edge of said tab, so that said lower edge of said tab will be in obstructing relation with said upper edge of the tooth, said end connecting members each having a predetermined number of said teeth, an equal number of slots being disposed between each pair of adjacent tabs, whereby a tab will coact with the upper edge of the tooth regardless of the position of said members, said slots being sufficiently wide to receive teeth of connecting members on opposite sides of said column, said tabs being sufficiently wide to lock teeth from both sides in position.

2. The combination according to claim 1, the upper edges of said teeth being so shaped that a screwdriver may be placed between one of said upper edges and the column web and extend past the tab immediately above, whereby upward movement of said tooth will cause its upper edge to ride on the shank of said screwdriver past the lower edge of said locking tab.

References Cited

UNITED STATES PATENTS

| | | | |
|---|---|---|---|
| 2,708,088 | 5/1955 | Steinke | 248—224 |
| 3,112,034 | 11/1963 | Kaufman et al. | 211—148 |
| 3,240,352 | 3/1966 | Baker | 211—177 |
| 3,265,456 | 8/1966 | Woolever | 211—148 |

EDWARD C. ALLEN, Primary Examiner